(12) United States Patent
Romero (10) Patent No.: US 11,091,081 B1
(45) Date of Patent: Aug. 17, 2021

(54) CRANE MAT LIFT

(71) Applicant: Samuel Romero, Thornton, CO (US)

(72) Inventor: Samuel Romero, Thornton, CO (US)

( * ) Notice: Subject to any disclaimer, the term of this patent is extended or adjusted under 35 U.S.C. 154(b) by 198 days.

(21) Appl. No.: 16/251,914

(22) Filed: Jan. 18, 2019

(51) Int. Cl.
*B60P 1/44* (2006.01)
*B66C 23/78* (2006.01)

(52) U.S. Cl.
CPC ............ *B60P 1/4428* (2013.01); *B66C 23/78* (2013.01); *B60P 1/4485* (2013.01)

(58) Field of Classification Search
CPC ....... B66C 23/78; B60P 1/4428; B60P 1/4485
See application file for complete search history.

(56) References Cited

U.S. PATENT DOCUMENTS

| | | |
|---|---|---|
| 6,666,643 B1 | 12/2003 | Heynssens |
| 7,101,143 B2 * | 9/2006 | Orthaus .................... E01F 9/70 414/551 |
| 7,419,185 B2 | 9/2008 | Richard |
| 7,748,943 B2 | 7/2010 | Studer |
| 9,028,195 B1 | 5/2015 | Heynssens |
| 9,038,835 B2 | 5/2015 | Oliver et al. |
| D738,936 S | 9/2015 | Kameyama et al. |
| 2003/0091418 A1 | 5/2003 | Ranken et al. |

FOREIGN PATENT DOCUMENTS

WO 2013/126334 A1 8/2013

* cited by examiner

*Primary Examiner* — Saul Rodriguez
*Assistant Examiner* — Willie Berry, Jr.
(74) *Attorney, Agent, or Firm* — Mark D. Trenner; Trenner Law Firm, LLC (57) ABSTRACT

A mat lift is disclosed. In an example, the mat lift may be configured to work with a truck-mounted crane to store and organize a plurality of mat pads. An example of the mat lift includes a channel track that extends rearwardly on a back end of the truck-mounted crane. The example channel track has a downward bend that extends the channel track vertically down a rear surface of the truck-mounted crane. The example channel track also includes a winch or roller that drives a cable or chain in order to move a trolley from a first horizontal end to a second vertical end of the channel track. In an example, the trolley includes a post member configured to receive at least one of the plurality of mat pads thereon.

16 Claims, 10 Drawing Sheets

CRANE MAT LIFT

BACKGROUND

A vehicular mat lift or crane mat lift is disclosed. Specifically, this is a device for storing, lifting, and deploying support mats that may be implemented to stabilize vehicles such as mobile cranes. The crane mat lift may be attached to vehicles including mobile cranes.

A truck-mounted crane is a workhorse of most construction jobs. The truck-mounted crane is a truck that has a crane mounted thereon. These types of cranes usually include at least one pair of stabilizing arms or outriggers. The at least one pair of stabilizing arms may telescope outwardly from a side of the crane in order to provide greater stabilization of the crane when in use. The stabilizing arms are not always implemented in flat, hard locations. Sometimes, crane mat pads are placed in between the bottom or foot of the stabilizing arm and the ground surface. The crane mat pads are heavy and take up a lot of space.

What is needed is a crane mat system that stores the crane mat pads when not in use. Due to the heavy weight of the crane mat pads, a further need is for the mat system to enable each mat pad to be placed onto or removed from the mat system to simplify and organize the plurality of crane mats that are provided with the truck-mounted crane.

DETAILED DESCRIPTION

A truck-mounted crane is a workhorse of most construction jobs. The truck-mounted crane is a truck that has a crane mounted thereon. These types of cranes usually include at least one pair of stabilizing arms. The at least one pair of stabilizing arms may telescope outwardly from a side of the crane in order to provide greater stabilization of the crane when in use. The stabilizing arms are not always implemented in flat, hard locations. Sometimes, mat pads are placed in between the bottom of the stabilizing arm and the ground surface. The mat pads are heavy and take up a lot of space.

What is needed is a mat system that stores the mat pads when not in use. Due to the heavy weight of the mat pads, a further need is for the crane mat system to enable each mat pad to be placed onto or removed from the mat system to simplify and organize the plurality of mats that are provided with the truck-mounted crane.

The vehicular mat lift or crane mat lift disclosed herein is a device configured to work with a truck-mounted crane in order to store and organize a plurality of mat pads. The mat lift includes a channel track that extends rearwardly on a back end of the truck-mounted crane. The channel track has a downward bend that extends the channel track vertically down a rear surface of the truck-mounted crane. The channel track includes a winch that drives a cable in order to move a trolley from a first horizontal end to a second vertical end of the channel track. The trolley includes a post member configured to receive at least one of the plurality of mat pads thereon. The winch moves the trolley from a location where the at least one of the plurality of mat pads is stored to a location where the at least one of the plurality of mat pads is retrievable. In use, the mat lift stores a stack of the mat pads on the back end of the truck-mounted crane. When the mat pads are needed, the winch propels the trolley down to the second vertical end of the channel track where one or more of the mat pads is retrieved and implemented with the stabilizing arms.

The vehicular mount lift may provide a system that stores and organizes a stack of mat pads on the rear end of a truck-mounted crane.

The vehicular mount lift may provide a system that utilizes a trolley that slides along a channel track in order to move the stack of mat pads from a stored vertical orientation, to an accessible horizontal orientation.

In an example, the vehicular mount lift provides an accessible horizontal orientation of the stack of mat pads being located aft of a rear surface of the truck-mounted crane such that an end user can pull off one or more of the mat pads from a post member of the trolley.

These together with additional objects, features and advantages of the vehicular mat lift or mat lift will be readily apparent to those of ordinary skill in the art upon reading the following detailed, but nonetheless illustrative, description, when taken in conjunction with the accompanying drawings.

By way of overview and with reference to the Figures, the crane mat lift 100 includes a channel track 101 that is further defined with a horizontal portion 102 and a vertical portion 103. The horizontal portion 102 meets the vertical portion 103 at a bend 104. The bend 104 is a ninety-degree bend that extends the vertical portion 103 downwards. The channel track 101 has an I-beam cross-section (see FIG. 4). The channel track 101 is configured to be mounted onto a back end of a truck-mounted crane 200.

Figure 6:
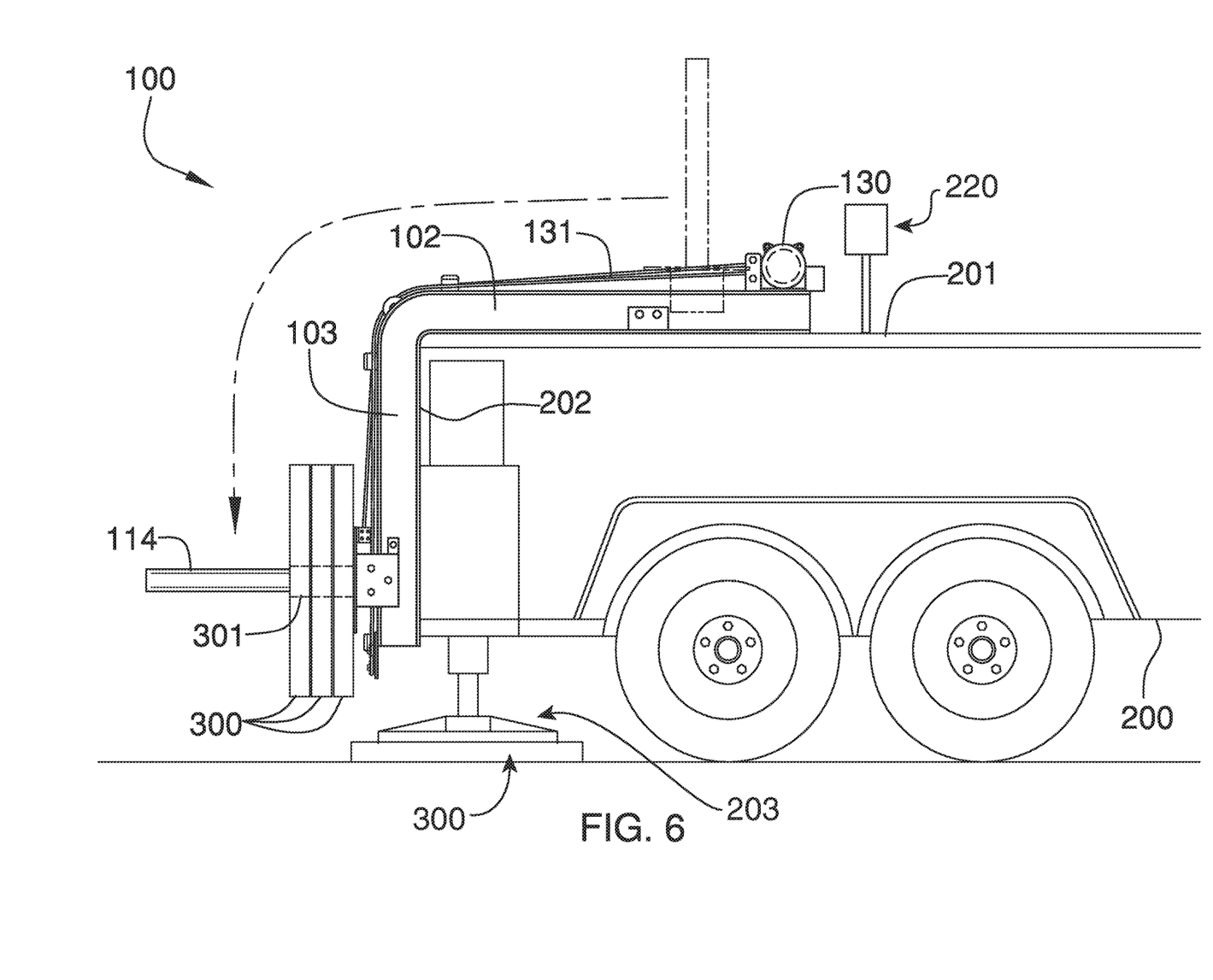
FIG. 6 is a side view of the example mat lift of FIG. 1.

Referring to FIG. 6, the channel track 101 is configured to be affixed onto a top surface 201 and a rear surface 202 of the truck-mounted crane 200. The horizontal portion 102 of the channel track 101 is configured to be affixed onto the top surface 201 of the truck-mounted crane 200. The top surface 201 of the truck-mounted crane 200 is horizontal and is corresponsive with the horizontal portion 102 of the channel track 101. The vertical portion 103 of the channel track 101 is configured to be affixed onto the rear surface 202 of the truck-mounted crane 200. The rear surface 202 of the truck-mounted crane 200 is vertical and is corresponsive with the vertical portion 103 of the channel track 101.

The channel track 101 is further defined with an outer member 105. The outer member 105 is visible from the rear end of the truck-mounted crane 200. Moreover, the outer member 105 is further defined with an outer surface 106 and an inner surface 107. The inner surface 107 faces a vertical member 108 and an inner member 109. The outer member 105 is parallel with the inner member 109. The vertical member 108 is perpendicular with the outer member 105 and the inner member 109. The outer member 105, the vertical member 108, and the inner member 109 collectively form the "I"-beam shape to form the channel track 101.

The crane mat lift 100 includes a trolley 110 configured to roll along the outer member 105. Moreover, the trolley 110 rolls across both the horizontal portion 102 and the vertical portion 103. The horizontal portion 102 may be further defined with a horizontal distal end 111. The vertical portion 103 may be further defined with a vertical distal end 112. The distance that spans from the horizontal distal end 111 to the vertical distal end 112 may be referred to as the travel distance that the trolley 110 may traverse.

The trolley 110 is further defined with a bracket plate 113 affixed to a post member 114. The post member 114 is perpendicularly-oriented with respect to the bracket plate 113. Moreover, the post member 114 extends vertically away from a top plate surface 115 of the bracket plate 113. The bracket plate 113 may be further defined with a bottom plate surface 116. The bottom plate surface 116 is opposite of the top plate surface 115. The trolley 110 is further defined with a pair of roller armatures 117 that extend downwardly from the bottom plate surface 116 of the bracket plate 113.

The pair of roller armatures 117 each include roller assemblies 118 each include a plurality of rollers 119. The plurality of rollers 119 are further defined with at least one top roller 120 and at least one bottom roller 121. The at least one top roller 120 and the at least one bottom roller 121 may roll with respect to the respective one of the pair of roller armatures 117. The at least one top roller 120 engages against and rolls along the outer surface 106 of the outer member 105. The at least one bottom roller 121 engages against and rolls along the inner surface 107 of the outer member 105.

The at least one bottom roller 121 works with the at least one top roller 120 to insure laminar movement of the roller assemblies 118 along the channel track 101. A winch 130 is affixed to the channel track 101. More specifically, the winch 130 is adjacent to the horizontal distal end 111 of the horizontal portion 102 of the channel track 101.

The winch 130 includes a cable 131 that extends along the channel track 101. The channel track 101 includes pulleys 132 along the outer surface 106 of the outer member 105. The pulleys 132 are provided adjacent to the bend 104. The channel track 101 also includes bottom pulleys 133 that are provided adjacent to the vertical distal end 112. The bottom pulleys 133 are provided adjacent to the outer surface 106 of the outer member 105. The pulleys 132 and the bottom pulleys 133 insure laminar movement of the cable 131 with respect to the channel track 101. The cable 131 is affixed to the bottom plate surface 116 of the bracket plate 113. The winch 130 is responsible for moving the cable 131 along the channel track 101 in order to move the roller bracket 110 back and forth with respect to the vertical distal end 112 and the horizontal distal end 111. It is noted that the cable 131 traverses along the channel track 101 twice.

The winch 130 is wired to a stop switch 134 located adjacent to the vertical distal end 112. The stop switch 134 is a normally open switch that is closed when the trolley 110 comes into contact with it. When closed, the stop switch 134 signals the winch 130 to reverse motion of the cable 131. A winch cable 135 attaches the winch 130 to the stop switch 134. A cable bracket 136 is affixed to the bottom plate surface 116 of the bracket plate 113. The cable bracket 136 rigidly secures the trolley 110 to the cable 131. The winch 130 is wired to an electrical source 12V, which may be provided on the truck-mounted crane 200.

Figure 5:
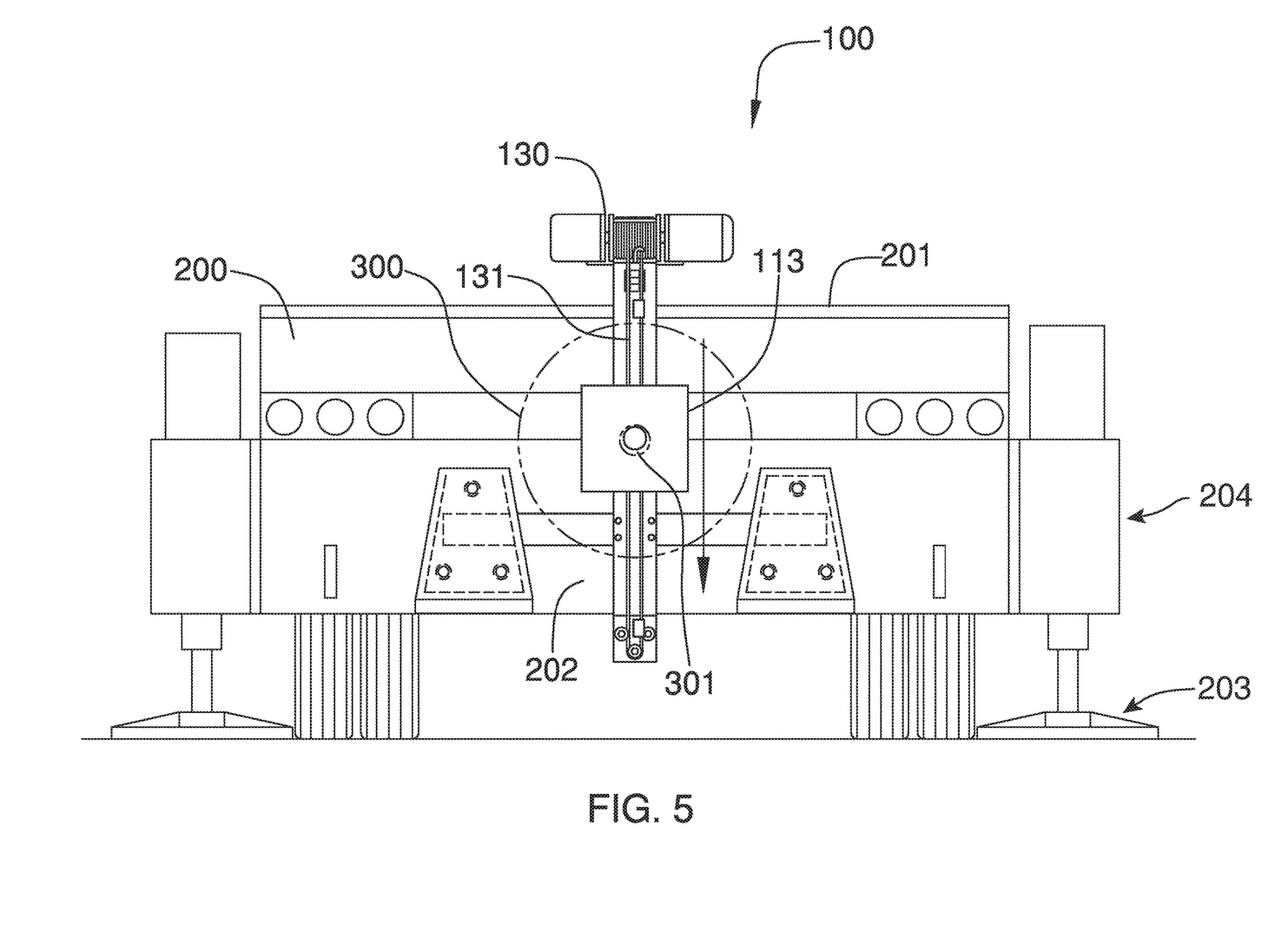
FIG. 5 is an end view of the example mat lift of FIG. 1.

Referring to FIGS. 5 and 6, the post member 114 is adapted to receive at least one mat pad 300 thereon. In use, the post member 114 can accommodate a stack of the mat pads 300. The movement of the trolley 110 moves the at least one mat pad 300 from a stored and vertical orientation upon the top surface 201 of the truck-mounted crane 200 to an accessible and horizontal orientation adjacent the rear surface 202 of the truck-mounted crane 200. The at least one mat pad 300 is further defined with a pad hole 301 that is centrally located. The pad hole 301 enables the at least one mat pad 300 to be placed onto the post member 114.

Figure 1:
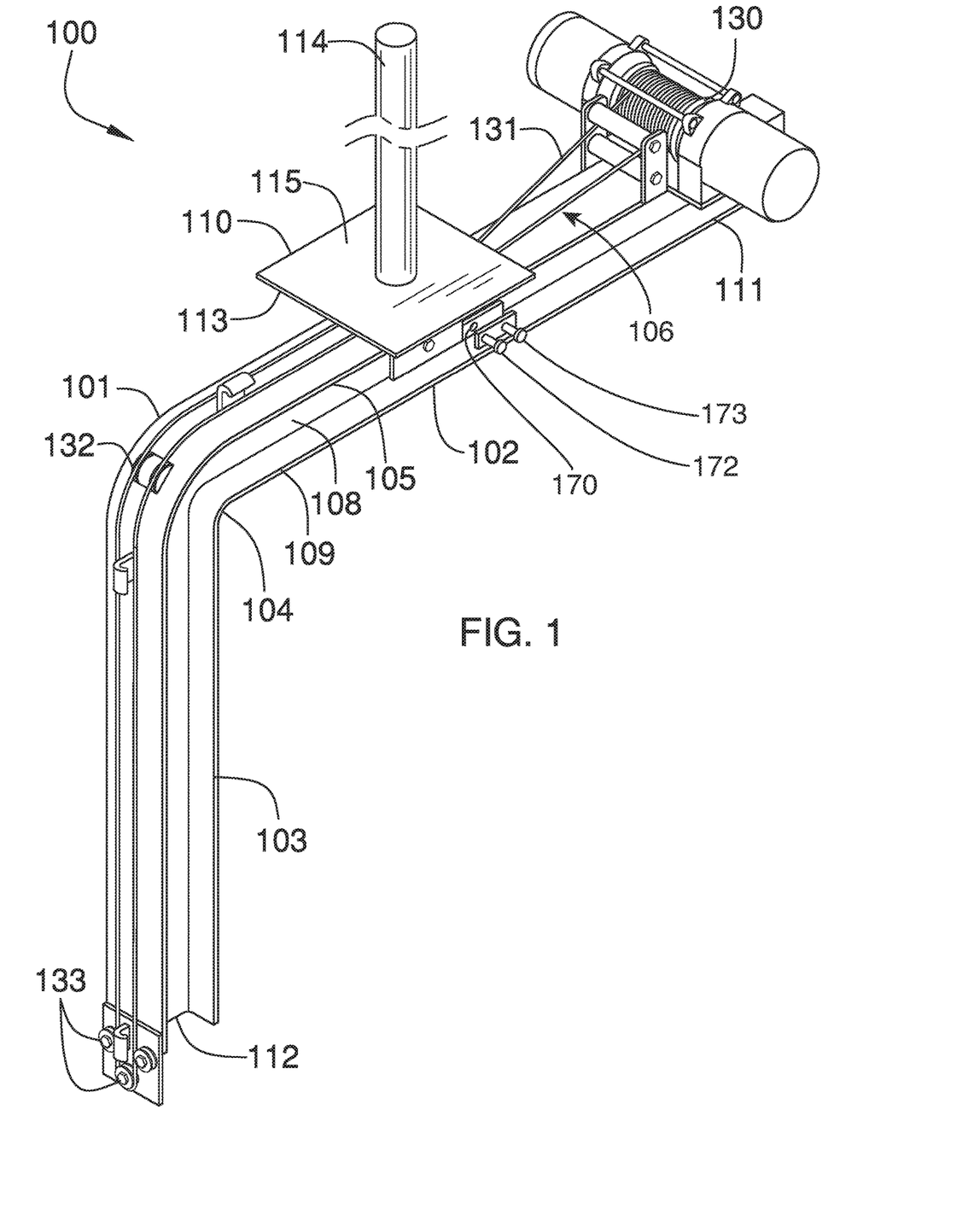
FIG. 1 is a perspective view of an example mat lift.

Referring to FIG. 1, one of the pair of roller armatures 117 of the trolley 110 is outfitted with a lock plate 170. The lock plate 170 includes at least one lock pin hole thereon. The horizontal portion 102 of the channel track 101 includes a lock pin 172 with at least one lock pin 173 provided thereon. The lock plate 170 of the trolley 110 may align with the lock pin 172 of the channel track 101 in order for the trolley 110 to be immobilized as needed. The at least one lock pin 173 of the lock pin 172 may extend inwardly in order to intercept with the at least ne lock pin hole of the lock plate 170 of the trolley 110.

It is noted that the winch 130 may include an upper winch guide roller 180 and a lower winch guide roller 181. The upper winch guide roller 180 and the lower winch guide roller 181 interface with the cable 131 to insure that the cable does not become entangled or otherwise out of alignment.

It is noted that the channel track 101 may include at least one guide arm 190. The at least one guide arm 190 is provided in a plurality of locales along the horizontal portion 102 as well as the vertical portion 103. The at least one guide arm 190 aids the cable 131 in staying in alignment and prevention of entanglement. The cable 131 extends back and forth along the channel track 101 so the at least one guide arm 190 prevents entanglement of the cable 131. The at least one guide arm 190 extends perpendicular from the channel track 101, and is further defined with a curved end 191.

In this respect, before explaining examples of the mat lift in detail, it is noted that as used herein, the terms "includes" and "including" mean, but is not limited to, "includes" or "including" and "includes at least" or "including at least" The term "based on" means "based on" and "based at least in part on."

It is also noted that the examples described herein are provided for purposes of illustration, and are not intended to be limiting. Other devices and/or device configurations may be utilized to carry out the operations described herein.

The operations shown and described herein are provided to illustrate example implementations. It is noted that the operations are not limited to the ordering shown. Still other operations may also be implemented.

FIG. 1 is a perspective view of an example vehicular mat lift or crane mat lift 100. The example mat lift 100 includes a channel track 101 that includes a horizontal portion 102 and a vertical portion 103. The horizontal portion 102 meets the vertical portion 103 at a bend 104 of about ninety degrees.

In an example, the channel track 101 is formed within an outer member 105, which includes an outer surface 106 a vertical surface 108 and a horizontal surface 109, such that the outer member 105 is parallel with the horizontal surface 109, and the vertical surface 108 is perpendicular with the outer member 105 and the horizontal surface 109. In an example, the outer member 105, the vertical surface 108, and the horizontal surface 109 collectively form an "I"-beam shape that functions as the channel track 101. Other shapes and arrangement of shapes may also be provided to create a channel track 101.

It is noted here that the terms "horizontal", "vertical", and "outer" are relative to the cross-section of the outer member 105, and do not reflect absolute coordinates.

The mat lift 100 additionally includes a trolley 110 configured to roll along the channel track 101 of the outer member 105. Moreover, the trolley 110 may roll across both the horizontal portion 102 and the vertical portion 103 of the channel track 101. The horizontal portion 102 of the channel track 101 includes a horizontal distal end 111. The vertical portion 103 includes a vertical distal end 112, separated from the horizontal distal end 111 to the vertical distal end by a "travel distance" over which the trolley 110 may traverse.

The trolley 110 includes a bracket plate 113 affixed to a post 114 that provides an attachment point for mat pads as they are moved from a storage location and orientation to a deployment location and orientation. In an example, the post 114 is substantially perpendicular to the upper surface 115 of the bracket plate 113.

The mat lift 100 additionally includes a winch 130, which actuates a cable 131 that extends along the channel track 101 in order to move the trolley 110. The cable 131 rolls along pulleys 132 that are located along the outer surface 106 of the outer member 105, proximate to the bend 104. The pulleys 132 ensure laminar movement of the cable 131 with respect to the channel track 101. The cable 131 also rolls along bottom pulleys 133 that are provided adjacent to the vertical distal end 112, that facilitate a turn in the cable 131 to bend it back toward the winch 130, enabling the trolley 110 to move back and forth in the channel track 101. The bottom pulleys 133 are affixed to the outer surface 106 of the outer member 105.

In an example, one of the pair of roller armatures 117 of the trolley 110 is outfitted with a lock plate 170. The lock plate 170 includes at least one lock pin hole thereon. The horizontal portion 102 of the channel track 101 includes a lock pin 172 with at least one lock pin 173 provided thereon. The lock plate 170 of the trolley 110 may align with the lock pin 172 of the channel track 101 in order for the trolley 110 to be immobilized as needed. The at least one lock pin 173 of the lock pin 172 may extend inward to intercept with a lock pin pin hole of the lock plate 170 of the trolley 110.

Before continuing, it is noted that the examples described above are provided for purposes of illustration, and are not intended to be limiting. Other devices and/or device configurations may be utilized to carry out the operations described herein.

Figure 2:
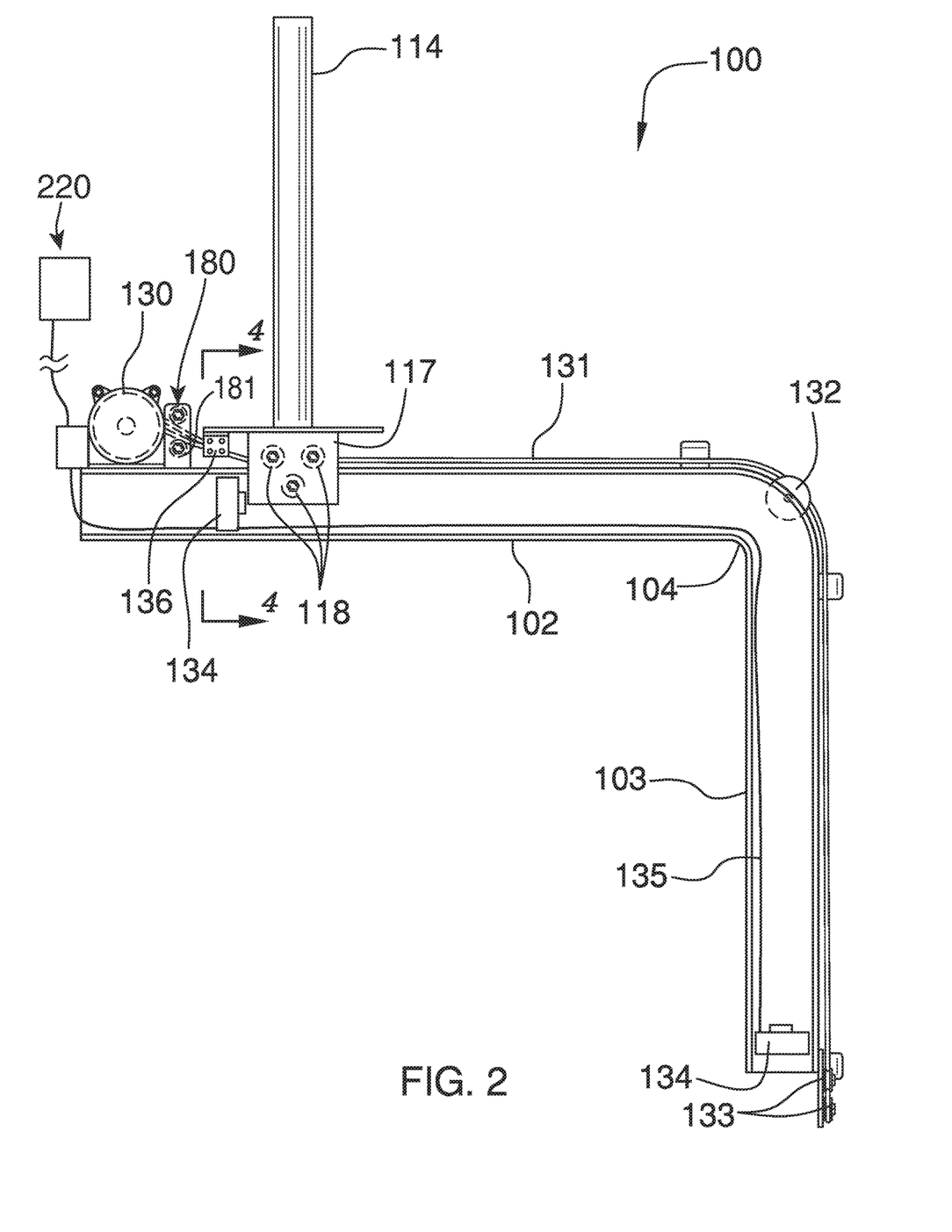
FIG. 2 is a side view of the example mat lift of FIG. 1.

FIG. 2 is a side view of an example mat lift 100, in which a number of additional components can be seen that are not visible in FIG. 1. In an example, the trolley 110 of the mat lift 100 includes a set of three roller armatures 117. The roller armatures 117 each include roller assemblies 118 that assist the trolley 110 in moving smoothly along the channel track 101.

In an example, the winch 130 is wired by electrical wires 135 to a first stop switch 134 located adjacent to the horizontal distal end 111 and a second stop switch 134 located adjacent to the vertical distal end 112 of the outer member 105. In an example, the stop switch 134 is a normally open switch that is closed when the trolley 110 comes into contact with it. When closed, the stop switch 134 signals the winch 130 to reverse motion of the cable 131. A cable bracket 136 is affixed to the bottom plate surface 116 of the bracket plate 113. The cable bracket 136 rigidly secures the trolley 110 to the cable 131. The winch 130 is wired to an electrical source 12V.

In an example, the winch 130 may include an upper winch guide roller 180 and a lower winch guide roller 181. The upper winch guide roller 180 and the lower winch guide roller 181 interface with the cable 131 to ensure that the cable does not become entangled or otherwise move out of alignment.

Figure 3:
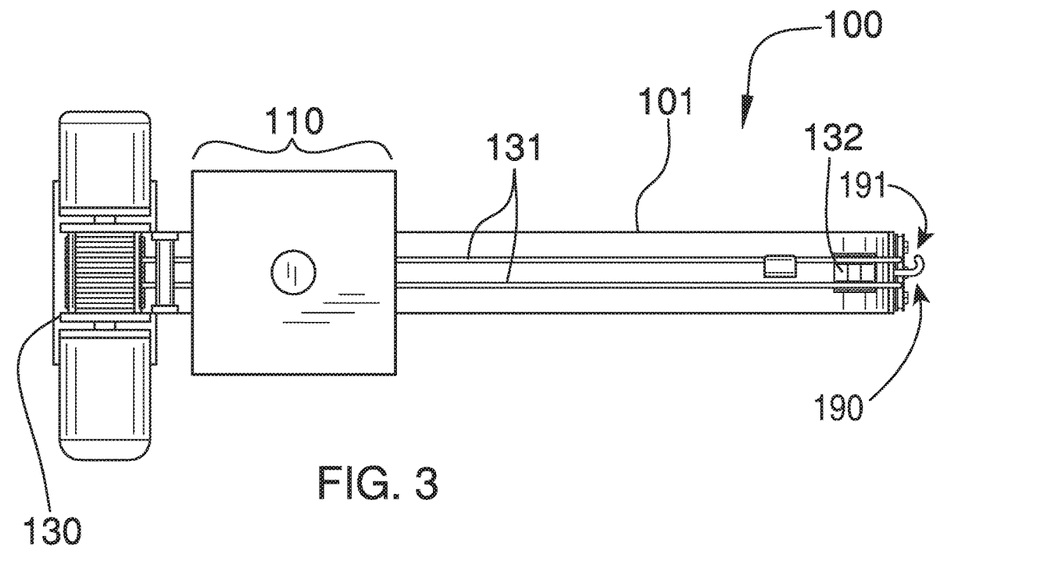
FIG. 3 is a top view of the example mat lift of FIG. 1.

FIG. 3 is a top view of an example mat lift 100, in which the channel track 101, trolley 110, winch 130, cable 131, and pulleys 132 are visible.

In an example, the channel track 101 may include at least one guide arm 190. The at least one guide arm 190 is provided in a plurality of locales along the horizontal portion 102 as well as the vertical portion 103 of the outer member 105. The at least one guide arm 190 aids the cable 131 in staying in alignment and prevention of entanglement. The cable 131 extends back and forth along the channel track 101 so the at least one guide arm 190 prevents entanglement of the cable 131. The at least one guide arm 190 extends perpendicular from the channel track 101, and is further defined with a curved end 191.

Figure 4:
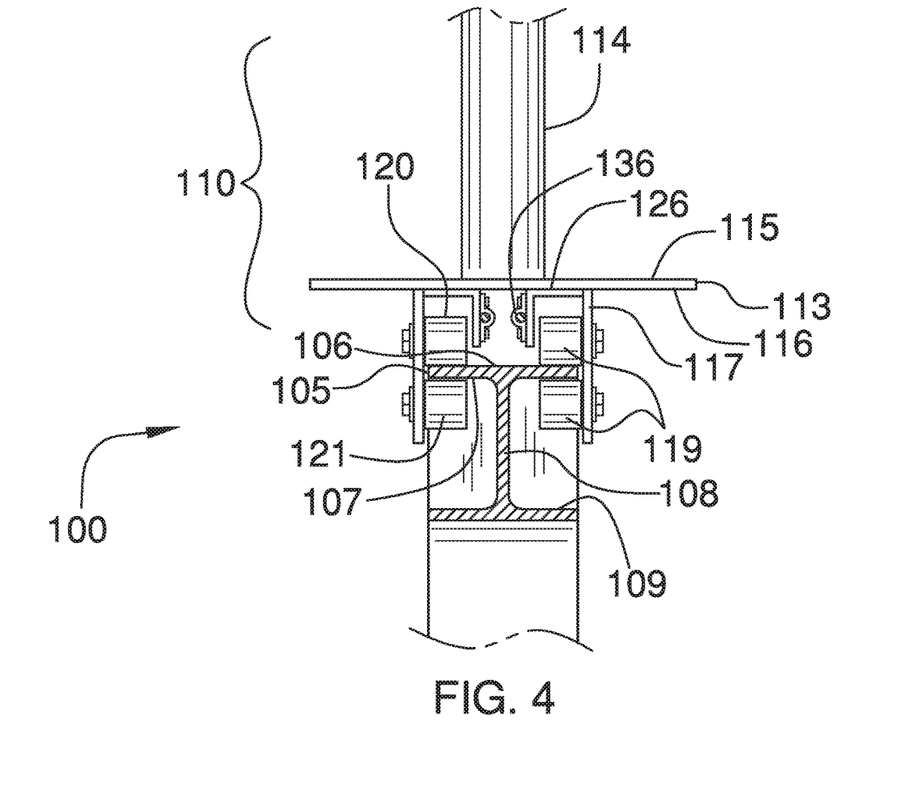
FIG. 4 is a cross-sectional view of the example mat lift along line 4-4 in FIG. 2.

FIG. 4 is a cross-sectional view of an example mat lift, along line 4-4 in FIG. 1. The post 114 is connected to the upper surface 115 of the bracket plate 113 such that it is substantially perpendicular to the upper surface 115. The bracket plate 113 also provides a lower surface 116 to which cable bracket mounts 126 are attached. Cable brackets 136 are attached to the cable bracket mounts 126, and the cable 131 anchors to one or more cable brackets 136, such that the trolley 110 can be conveyed back and forth along the channel track 101. In an example, the cable 131 is a single cable that extends down the length of the outer member 105 and then back up it, and therefore in order for the trolley 110 to move, the cable brackets 136 may be attached to this cable 131 on either the left or the right side (relative to this cross section), but not both.

In an example, the trolley 110 also includes a set of roller armatures 117 that extend downward (relative to this cross section) from the bottom plate surface 116 of the bracket plate 113. The roller armatures 117 each include roller assemblies 118 that each include a plurality of rollers 119. In an example, the plurality of rollers 119 each include at least one top roller 120 and at least one bottom roller 121. In an example, the top rollers 120 and the bottom rollers 121 may roll with respect to the roller armatures 117. Each top roller 120 may engage against and roll along the outer surface 106 of the outer member 105. Each bottom roller 121 may engage against and roll along the inner surface 107 of the outer member 105, such that the trolley 110 may move back and forth in the channel track 101.

FIG. 5 is an end view of an example crane mat lift 100 in use, wherein the mat lift 100 is mounted onto a back end of a truck-mounted crane 200. In an example, the at least one mat pad 300 is further defined with a pad hole 301 that is centrally located. The pad hole 301 enables the at least one crane mat pad 300 to be placed onto the post member 114. In use, the post 114 can accommodate a stack of the mat pads 300. In an example, the trolley 110 initially holds the stack of mat pads 300 in a vertical storage orientation against the bracket plate 113 on the top surface 201 of the truck-mounted crane 200. When activated in order to facilitate unloading of the mat pads by operator, the trolley 110 then moves the stack of mat pads 300 to an accessible location and horizontal orientation adjacent the rear surface 202 of the truck-mounted crane 200. The pad hole 301 enables the at least one mat pad 300 to be removed from the post 114 by operator for use in stabilizing the truck mounted crane 200. When no longer needed, the mat pads 300 are then returned to the post 114, and the roller trolley 110 is moved and rotated back into the storage position and orientation.

For visual clarity, the winch 130 and cable 131 are also called out in this view, along with a stabilizing foot 203 projecting from a stabilizing arm or outrigger 204 of the truck-mounted crane 200.

FIG. 6 is a side view of an example mat lift in use, wherein the mount lift 100 is affixed to a top surface 201 and a rear surface 202 of the truck-mounted crane 200. The horizontal portion 102 of the channel track 101 is affixed onto the top surface 201 of the truck-mounted crane 200. The top surface 201 of the truck-mounted crane 200 is substantially horizontal and in substantially the same orientation as the horizontal portion 102 of the channel track 101. The vertical portion 103 of the channel track 101 is affixed onto the rear surface 202 of the truck-mounted crane 200. The rear surface 202 of the truck-mounted crane 200 is substantially vertical and in substantially the same orientation as the vertical portion 103 of the channel track 101.

In this example view, it can be seen more clearly how the post 114 of the mat lift 100 passes through the hole 301 in each mat pad 300, such that the mat pads 300 are held on the mat lift 100.

In an example, the winch 130 is wired to the electrical source 12V, which is provided on the truck-mounted crane 200.

In an example, a foot 203 of the truck-mounted crane 200 rests upon an additional mat pad 300, showing an intended purpose of the mat pads.

Figure 7:
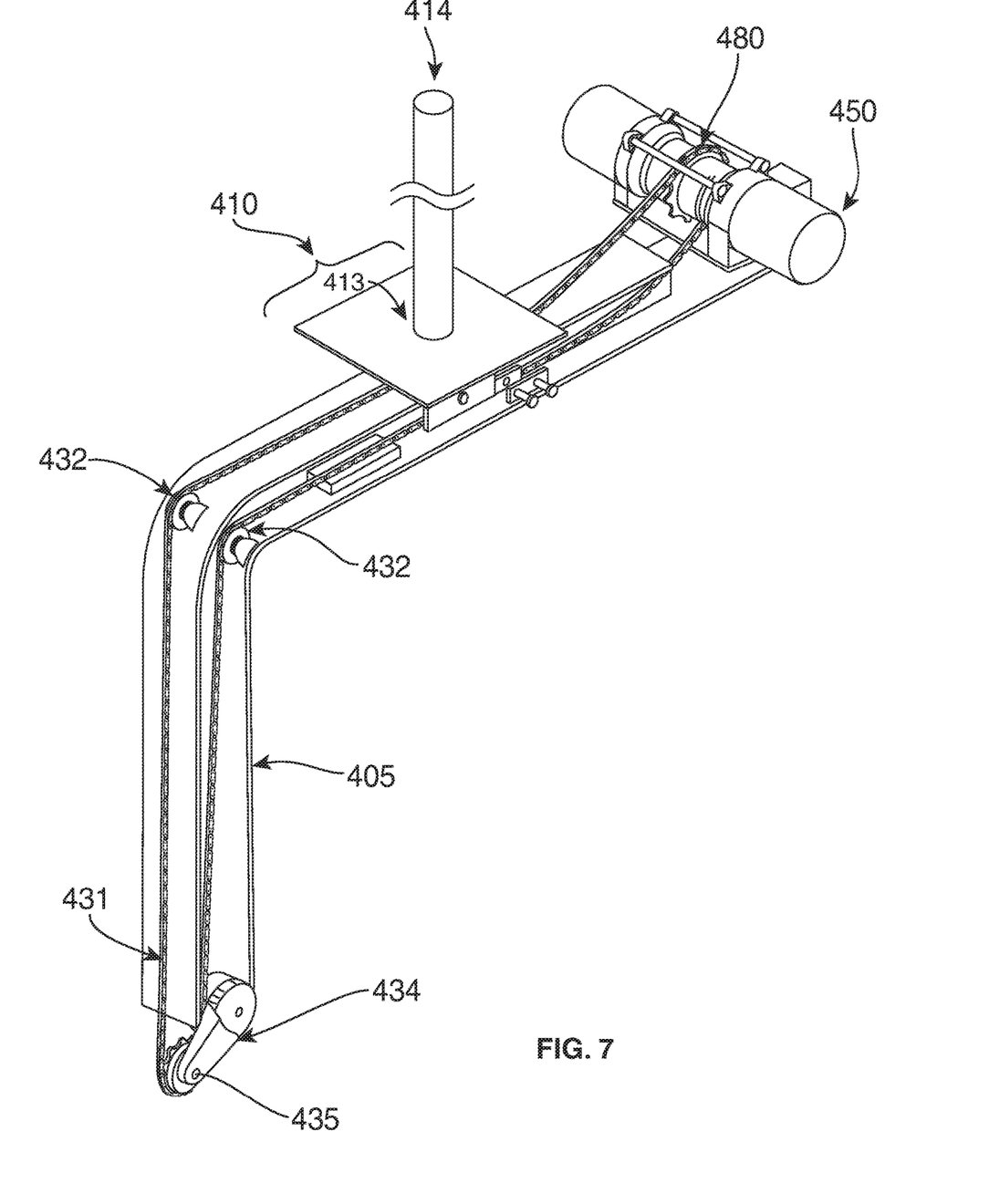
FIG. 7 is a perspective view of another example mat lift.

FIG. 7 is a perspective view of another example mount lift 100. In the example shown in FIG. 7, the cable-winch drive system described above has been replaced with a chain drive system as described below.

Other components and operation remain the same, except that the winch 130 of the previous examples is comparable in function with a winch 430 in the present example, and the cable 131 of previous examples is comparable in function with a drive chain 431 in the present example. In addition, pulleys 432 serve as a chain guide with a lower sprocket 433 rotating around a lower tensioner 235 and held in place by a lower tensioner 434 in the present example. An optional chain guard may be provided behind the pulleys 432. Sprocket 480 may operate to drive the chain.

The structure and operation of the device are otherwise substantially similar to the examples described in FIGS. 1-6. The sprocket 480 is turned by the winch 430 to drive the drive chain 431, which is attached to the trolley 410, which carries the bracket plate 413 and post assembly 414 along the outer member 405, from a storage position or orientation to a deployment and retrieval position or orientation. The bracket plate and 413 and post member 414 collectively form a holding mechanism for the vehicular mats 300. The trolley 410, winch 430, drive chain 431, pulleys 432 and lower tensioner 433 collectively form a carriage mechanism. It is noted that as shown, the drive chain 431 includes both a chain portion and a belt portion. However, in another example, the drive chain 431 may be entirely chain and pulleys 432 would include sprockets.

Figure 8:
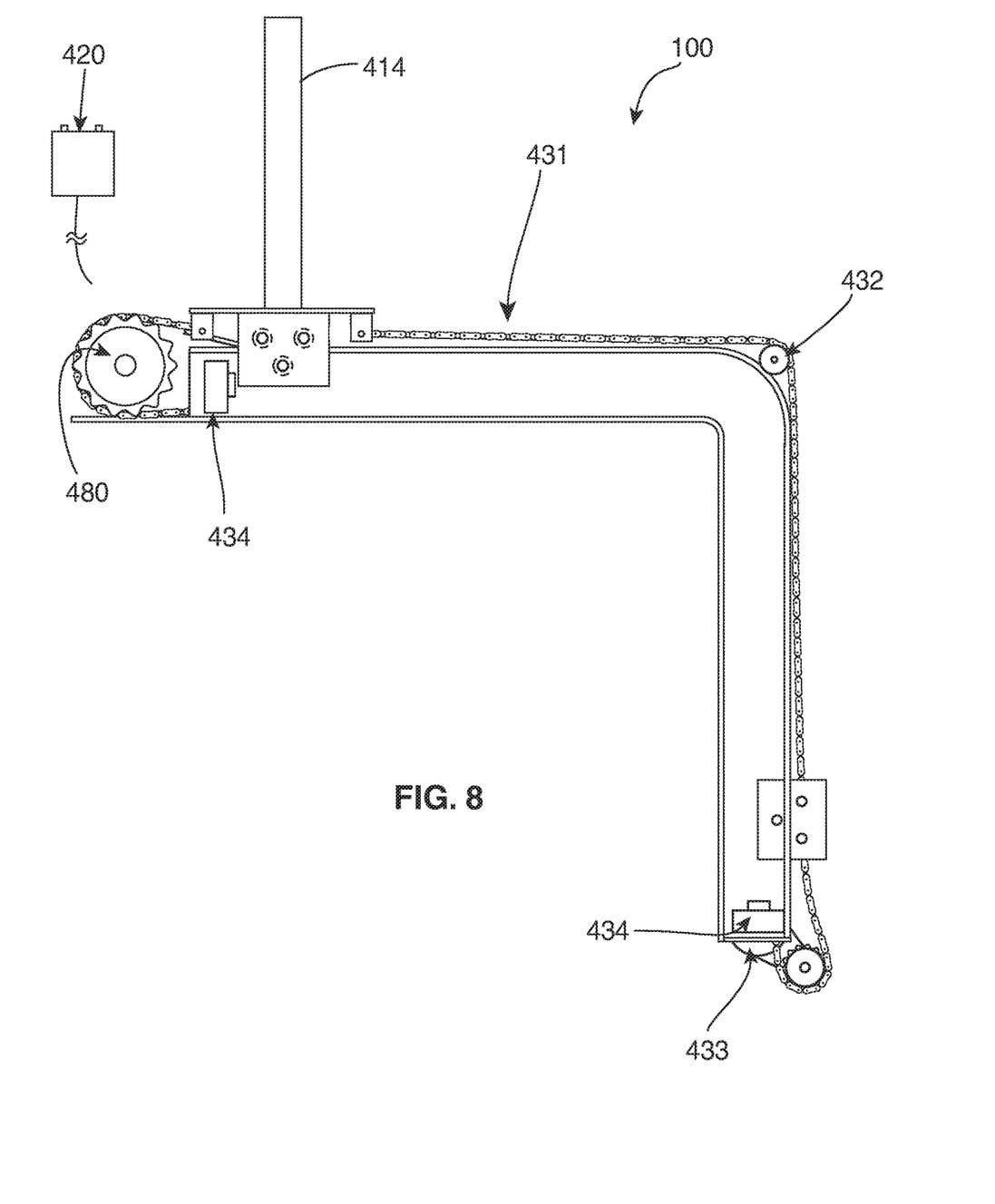
FIG. 8 is a side view of the example mat lift of FIG. 7.

FIG. 8 is a side view of an example mat lift 100 substantially similar to the example of FIG. 7. The post member 414 is visible, along with a power supply 420, drive chain 431, pulleys 432, lower tensioner 433, stop switches 434, and sprocket 480. The function of the stop switches 434 in this example is analogous to the function of stop switches 134 in previous examples.

Figure 9:
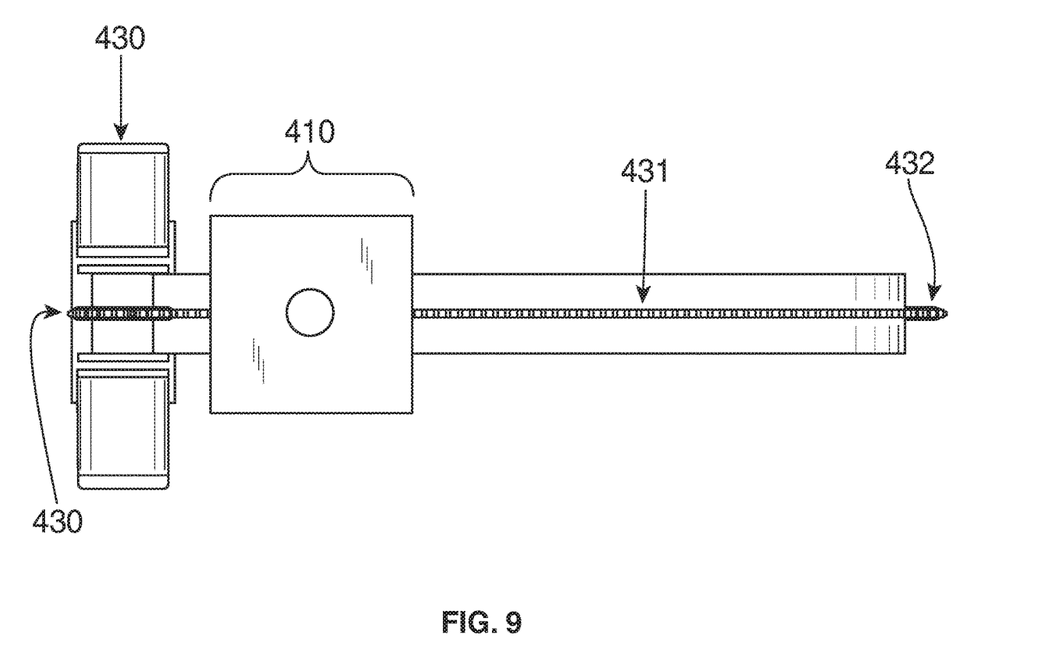
FIG. 9 is a top view of the example mat lift of FIG. 7.

FIG. 9 is a top view of an example mat lift 100, which is substantially similar to the example of FIGS. 7 and 8. The trolley 410 is visible, along with the winch 430, chain 431, pulley 432, and sprocket 480.

Figure 10:
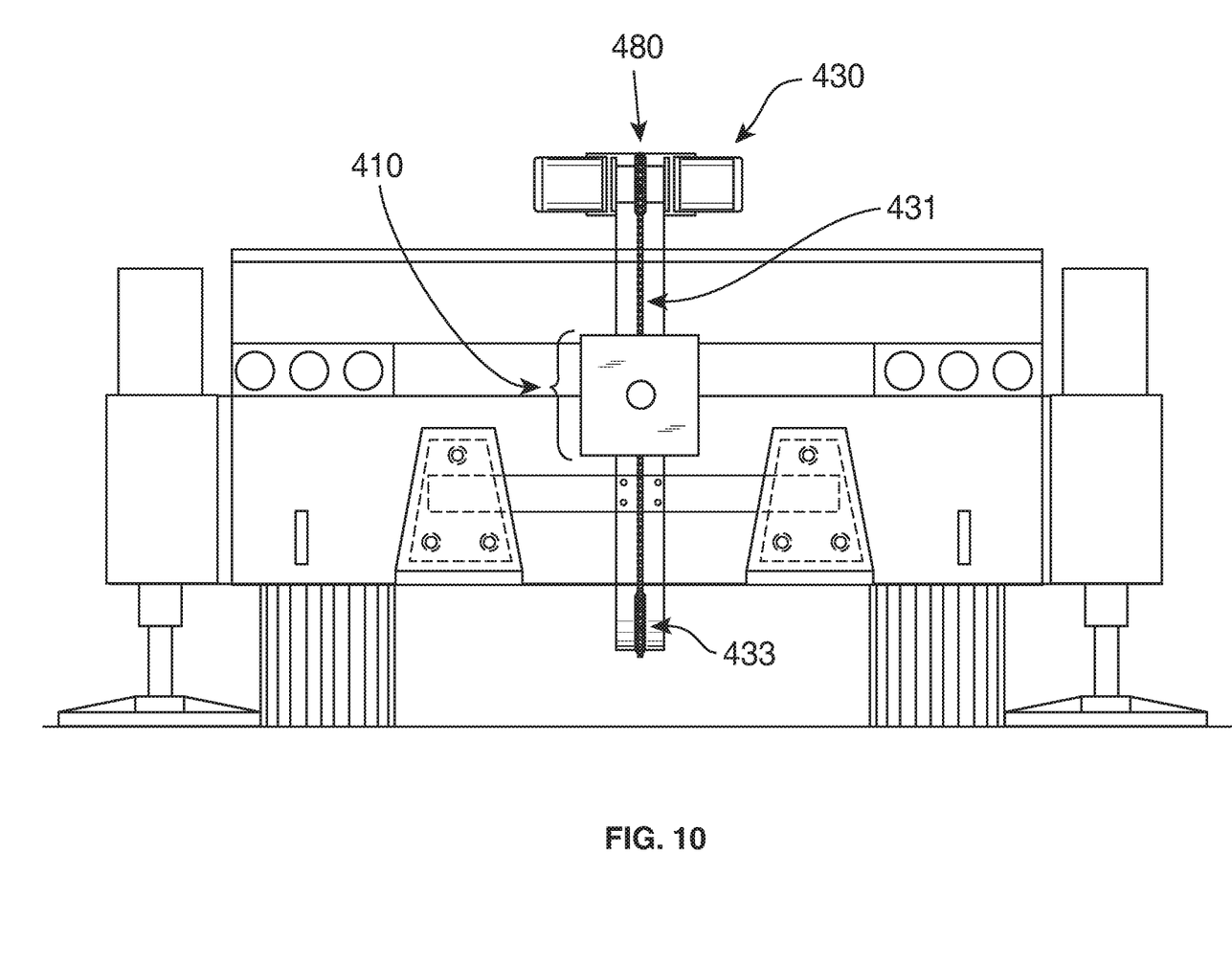
FIG. 10 is an end view of the example mat lift of FIG. 7, shown as it may be mounted to a vehicle.

FIG. 10 is an end view of an example mat lift 100 mounted to a vehicle, wherein the trolley 410, winch 430, drive chain 431, lower sprocket 433, tensioner 434, and sprocket 480 are visible.

Figure 11:
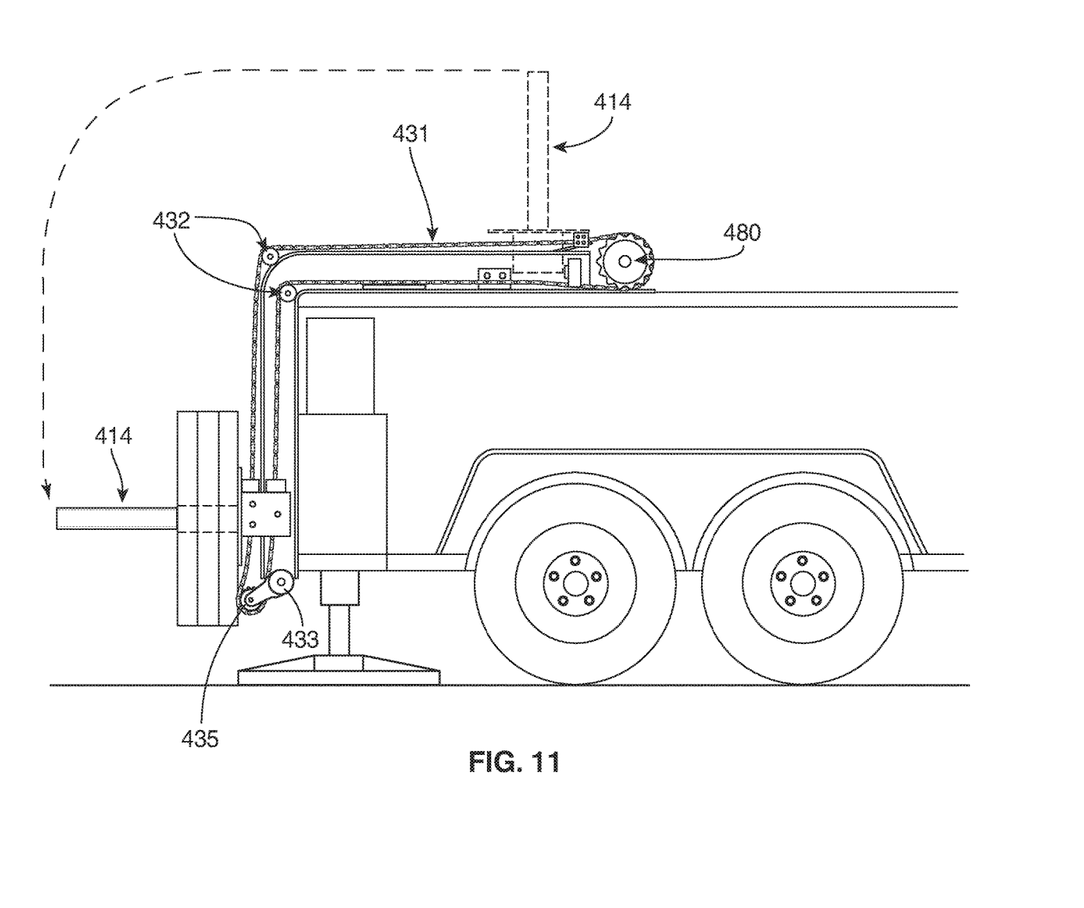
FIG. 11 is a side view of the example mat lift of FIG. 7 as it may be mounted to a vehicle.

FIG. 11 is a side view of an example mat lift 100 mounted to a vehicle, wherein the post member 414, drive chain 431, pulleys 432, lower sprocket 433, sprocket axle 435, and sprocket 480 are visible.

It is noted that the terms "mat" and "mat pad" are used herein to refer to any substantially rigid, substantially flat, substantially deployable device to be placed under the tires, wheels, stabilizing arms, or stabilizing feet of a vehicle that may benefit from such placement. The terms "crane", "truck", "crane truck", and "truck-mounted crane" are used herein to refer to any vehicle with or without stabilizing arms and feet substantially as shown in FIGS. 5 and 6, that may benefit from the placement of mats or mat pads under its tires, wheels, stabilizing arms, or stabilizing feet.

It is noted that the dimensional relationship for the various components of the mat lift described with reference FIGS. 1 through 11, may include variations in size, materials, shape, form, function, and manner of operation, assembly and use, and all equivalent relationships to those illustrated in the drawings and described in the specification are intended to be encompassed by the vehicular mat lift or crane mat lift. Those skilled in the art will recognize numerous adaptations and modifications which can be made to the various examples of the crane mat lift, yet all of which fall within the spirit and scope of the present crane mat lift as defined in the following claims.

The examples shown and described are provided for purposes of illustration and are not intended to be limiting. Still other examples are also contemplated.

The invention claimed is:

1. A vehicular mat lift comprising:
   a channel track from which a trolley translates thereon, the channel track configured to be affixed to a rear end of a vehicle, the trolley configured to receive at least one mat pad thereon, and the trolley configured to store and organize the at least one mat pad in a vertical orientation or at an accessible and horizontal orientation,
   a horizontal portion and a vertical portion of the channel track, the horizontal portion meets the vertical portion at a substantially ninety-degree bend that extends the vertical portion downwards;
   wherein the channel track has an I-beam cross-section, the channel track is configured to be affixed onto a top surface and a rear surface of the vehicle, the horizontal portion of the channel track is configured to be affixed onto the top surface of the vehicle, the top surface of the vehicle is horizontal and corresponds with the horizontal portion of the channel track, and the vertical portion of the channel track is configured to be affixed onto the rear surface of the vehicle;
   wherein the channel track is further defined with an outer member, the outer member is visible from the rear end of the vehicle, the outer member is further defined with an outer surface and an inner surface, and the outer member is parallel with the inner surface, the inner surface faces a vertical member and an inner member, the vertical member is perpendicular with the outer member and the inner member, and the outer member, the vertical member, and the inner member collectively form the "I"-beam shape that is the channel track; and wherein the rear surface of the vehicle is vertical and corresponds with the vertical portion of the channel track;

wherein the trolley rolls along the outer member of the channel track, and the trolley rolls across both the horizontal portion and the vertical portion.

2. The vehicular mat lift according to claim 1:

wherein the horizontal portion is further defined with a horizontal distal end;

wherein the vertical portion is further defined with a vertical distal end; and wherein the distance that spans from the horizontal distal end to the vertical distal end is the travel distance that the trolley traverses.

3. The vehicular mat lift according to claim 2:

wherein the trolley is further defined with a bracket plate affixed to a post member;

wherein the post member is perpendicularly-oriented with respect to the bracket plate;

wherein the post member extends vertically away from a top plate surface of the bracket plate; and wherein the at least one mat pad includes a pad hole configured to be placed onto the post member.

4. The vehicular mat lift according to claim 3:

wherein the bracket plate is further defined with a bottom plate surface;

wherein the bottom plate surface is opposite of the top plate surface; and wherein the trolley is further defined with a pair of roller armatures that extend downwardly from the bottom plate surface of the bracket plate.

5. The vehicular mat lift according to claim 4:

wherein the pair of roller armatures each include roller assemblies each include a plurality of rollers;

wherein the plurality of rollers are further defined with at least one top roller and at least one bottom roller;

wherein the at least one top roller and the at least one bottom roller roll with respect to the respective one of the pair of roller armatures;

wherein the at least one top roller engages against and rolls along the outer surface of the outer member; and wherein the at least one bottom roller engages against and rolls along the inner surface of the outer member.

6. The vehicular mat lift according to claim 5:

wherein the at least one bottom roller works with the at least one top roller to insure laminar movement of the roller assemblies along the channel track;

wherein a winch is affixed to the channel track; and wherein the winch is adjacent to the horizontal distal end of the horizontal portion of the channel track.

7. The vehicular mat lift according to claim 6:

wherein the winch includes a cable that extends along the channel track;

wherein the channel track includes pulleys along the outer surface of the outer member;

wherein the pulleys are provided adjacent to the bend; and wherein the channel track also includes bottom pulleys that are provided adjacent to the vertical distal end.

8. The vehicular mat lift according to claim 7:

wherein the bottom pulleys are provided adjacent to the outer surface of the outer member;

wherein the pulleys and the bottom pulleys insure laminar movement of the cable with respect to the channel track;

wherein the cable is affixed to the bottom plate surface of the bracket plate;

wherein the winch is responsible for moving the cable along the channel track in order to move the trolley back and forth with respect to the vertical distal end and the horizontal distal end; and wherein the cable traverses along the channel track twice.

9. The vehicular mat lift according to claim 8:

wherein the winch is wired to a stop switch located adjacent to the vertical distal end;

wherein the stop switch is a normally open switch that is closed when the roller bracket comes into contact with it;

wherein when closed, the stop switch signals the winch to reverse motion of the cable; and wherein a winch cable attaches the winch to the stop switch.

10. The vehicular mat lift according to claim 9:

wherein a cable bracket is affixed to the bottom plate surface of the bracket plate; and wherein the cable bracket rigidly secures the trolley to the cable; wherein the winch is wired to an electrical source 12V.

11. The vehicular mat lift according to claim 10:

wherein one of the pair of roller armatures of the trolley is outfitted with a lock plate; and wherein the lock plate includes at least one lock pin hole thereon.

12. The vehicular mat lift according to claim 11:

wherein the horizontal portion of the channel track includes a lock bracket with at least one lock pin provided thereon;

wherein the lock plate of the trolley align with the lock bracket of the channel track in order for the trolley to be immobilized as needed; and wherein the at least one lock pin of the lock bracket extend inwardly in order to intercept with the at least one lock pin hole of the lock plate of the trolley.

13. The vehicular mat lift according to claim 12:

wherein the winch includes an upper winch guide roller and a lower winch guide roller; and wherein the upper winch guide roller and the lower winch guide roller interface with the cable to insure that the cable does not become entangled or otherwise out of alignment.

14. The vehicular mat lift according to claim 13:

wherein the channel track includes at least one guide arm;

wherein the at least one guide arm is provided in a plurality of locales along the horizontal portion as well as the vertical portion;

wherein the at least one guide arm aids the cable in staying in alignment and prevention of entanglement; and wherein the at least one guide arm extends perpendicular from the channel track, and is further defined with a curved end.

15. A vehicular mat lift for storing one or more vehicle stabilizing mats on a vehicle and deploying the vehicle stabilizing mats from the vehicle, comprising:

a storage location and orientation for the vehicle stabilizing mats;

a deployment location and orientation for the vehicle stabilizing mats;

a holding mechanism for the vehicle stabilizing mats;

a carriage mechanism attached to the holding mechanism;

a drive mechanism for the carriage mechanism;

a track or outer member along which the carriage mechanism travels, such that the holding mechanism may move from the storage location and orientation to the deployment location and orientation, to facilitate unloading of the vehicle stabilizing mats, and such that when the vehicle stabilizing mats are reloaded into or onto the holding mechanism, the holding mechanism may move from the deployment location and orientation back to the storage location and orientation;

wherein the drive mechanism includes a motor, gear, drive chain, and sprockets.

16. A vehicular mat lift comprising:

a channel track configured to be affixed to a vehicle;

a trolley translating on the channel track, the trolley configured to receive at least one mat pad thereon, and the trolley configured to store and organize the at least one mat pad in a vertical orientation or at an accessible and horizontal orientation; and an outer member of the channel track, the outer member having an outer surface and an inner surface, the outer member is parallel with the inner member, the inner surface faces a vertical member and an inner member, the vertical member is perpendicular with the outer member and the inner member, and the outer member, the vertical member, and the inner member collectively form the channel track; and wherein a rear surface of the vehicle is vertical and corresponds with the vertical portion of the channel track; and wherein the trolley rolls along the outer member of the channel track, and the trolley rolls across both the horizontal portion and the vertical portion.

\* \* \* \* \*